US005115185A

United States Patent [19]

Fraidlin et al.

[11] Patent Number: 5,115,185

[45] Date of Patent: May 19, 1992

[54] SINGLE CONVERSION POWER FACTOR CORRECTION USING SEPTIC CONVERTER

[75] Inventors: Simon Fraidlin, Plano; William F. Slack, Garland; James C. Wadlington, Dallas, all of Tex.

[73] Assignee: AT&T Bell Laboratories, Murray Hill, N.J.

[21] Appl. No.: 590,410

[22] Filed: Sep. 28, 1990

[51] Int. Cl.[5] ................ G05F 1/56

[52] U.S. Cl. ................ 323/207; 363/45

[58] Field of Search ................ 323/207, 275, 282, 285, 323/299, 45, 46; 307/66, 48

[56] References Cited

U.S. PATENT DOCUMENTS

| | | | |
|---|---|---|---|
| 4,560,887 | 12/1985 | Schneider | 307/66 |
| 4,644,254 | 2/1987 | Panse | 323/282 |
| 4,720,667 | 1/1988 | Lee et al. | 323/271 |
| 4,729,082 | 3/1988 | Sato | 363/41 |

*Primary Examiner*—Steven L. Stephan
*Assistant Examiner*—Emanuel Todd Voeltz
*Attorney, Agent, or Firm*—A. G. Steinmetz

[57] ABSTRACT

A SEPIC converter powered off line is controlled to improve the input power factor by forcing the current in the input inductor to assume the same wave shape as the voltage across the inductor in series with the power switch to insure a sinewave input current. A switched capacitor is provided to provide brief holdover power to the converter should the input AC voltage fail.

4 Claims, 1 Drawing Sheet 268 267 264 252 205 213 220 223 225 203 263 262 261 207 219 221 224 226 227 243 AC INPUT 211 265 241 229 231 251 WAVEFORM DETECTOR & CONTROL PWM SWITCH DRIVE 234 ERROR AMPL

SINGLE CONVERSION POWER FACTOR CORRECTION USING SEPTIC CONVERTER

FIELD OF THE INVENTION

This invention relates to a method and apparatus for the reduction of input line harmonics generated at the input to switch mode power supplies and in particular to power factor correction at that input by active control of the current waveform.

BACKGROUND OF THE INVENTION

Switch mode power supplies which operate off an AC line generally have a passive input filter and a rectifier which charges a large charge storage capacitor shunting the input to the switching circuitry of the power supply. Current input to the power supply tends to occur in short pulse-like waveforms with high peak values which are very short in duration compared to the period of the substantially sinusoidal waveform of the input AC voltage. This is due in part to the acquired voltage of the capacitor backing the rectifying diodes during a large fraction of the input voltage waveform period whereby current is drawn from the AC line only during the peak portions of the AC voltage waveform. This pulsed input current has a high RMS current component and is rich in odd harmonics resulting in a poor power factor at the input of the power supply.

Techniques to improve the power factor of a power supply operated off of an AC line have included many approaches to reduce the harmonic components of the current such as passive input filtering which is designed to attenuate specific harmonics of the input current. Due to the need to provide filtering to filter individual harmonics, the magnetic components required add substantial bulk and weight to the power supply and, further, being operative at only specific frequencies is not desirable in many applications.

Active control of the current wave shape can be used to control the input impedance to approximate a resistive load at the input and produce a very high power factor at the input. A boost type converter with a feedback control to control the duty ratio of its power switch is inserted between the rectifier and the storage capacitor to control the current waveform. A subsequent converter is connected in cascade with the boost converter and is used to achieve voltage step down and provide isolation and an extra degree of control of line and load regulation.

In one widely used active waveform control arrangement a boost type converter operated at a frequency higher than the frequency of the input AC power signal and having a feedback control to control the duty ratio of its power switch is inserted between the rectifier and the storage capacitor. The switching duty cycle is controlled in such a manner so as to control the input current waveform to conform to some desired shape which is proportional to and normally approximates the input voltage waveform. A subsequent converter is used to provide isolation, voltage step down and achieve line and load regulation.

This cascade arrangement of two power converters is costly and reduces the overall conversion efficiency because the combined efficiencies are multiplications of the individual efficiencies resulting in a lowered overall efficiency. One solution to this has been the three switched network circuit in which a second control switch and a rectifier is added to the shaper converter with the second switch being dedicated to controlling the output voltage level. The need for additional control circuitry unnecessarily increases the overall cost of this arrangement.

SUMMARY OF THE INVENTION

A SEPIC converter powered off line is controlled to improve the input power factor by forcing the current in the input inductor to assume the same wave shape as the voltage across the inductor in series with the power switch to insure a sinewave input current. A switched capacitor is provided to provide brief holdover power to the converter should the input AC voltage fail.

This particular arrangement combines power factor correction and regulation into one power converter unit replacing the two cascaded power converter units previously required. This arrangement significantly reduces the cost of a OLS power supply as compared to conventional cascaded units of like performance.

DETAILED DESCRIPTION

Figure 1:
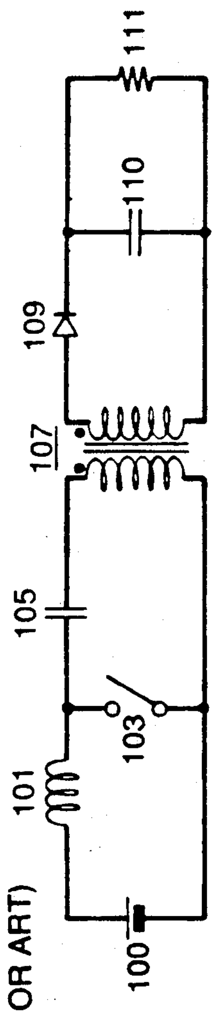
FIG. 1 is a schematic of a SEPIC power converter.

A SEPIC converter as shown in FIG. 1 is nominally considered related to a boost type converter based on the location of the input inductor 101 and power switch 103, but it is basically different in operation and in its overall schematic. It is capable of both step up and step down conversion depending on the power switch duty cycle. The major change from the boost type converter is the replacement of the boost's rectifying diode with the coupling capacitor 105. Input-output isolation is provided by a transformer 107. The transformer is coupled to a load 111 via a rectifying diode 109. The capacitor 110 provides filtering for the output load signal. While the input power is shown as a DC voltage source 100, it may be derived from rectified AC power.

In operation a SEPIC converter utilizes the capacitor 105 to block the DC component of the input power signal so that a transformer may be inserted into the input-to-output power path to allow voltage transformation. When power switch 103 is conducting, (i.e. closed) current flow from the input power source stores energy in the inductor 101. This stored energy of inductor 101 provides a current to charge the capacitor 110, when the power switch 103 is non-conducting (i.e. open).

Figure 2:
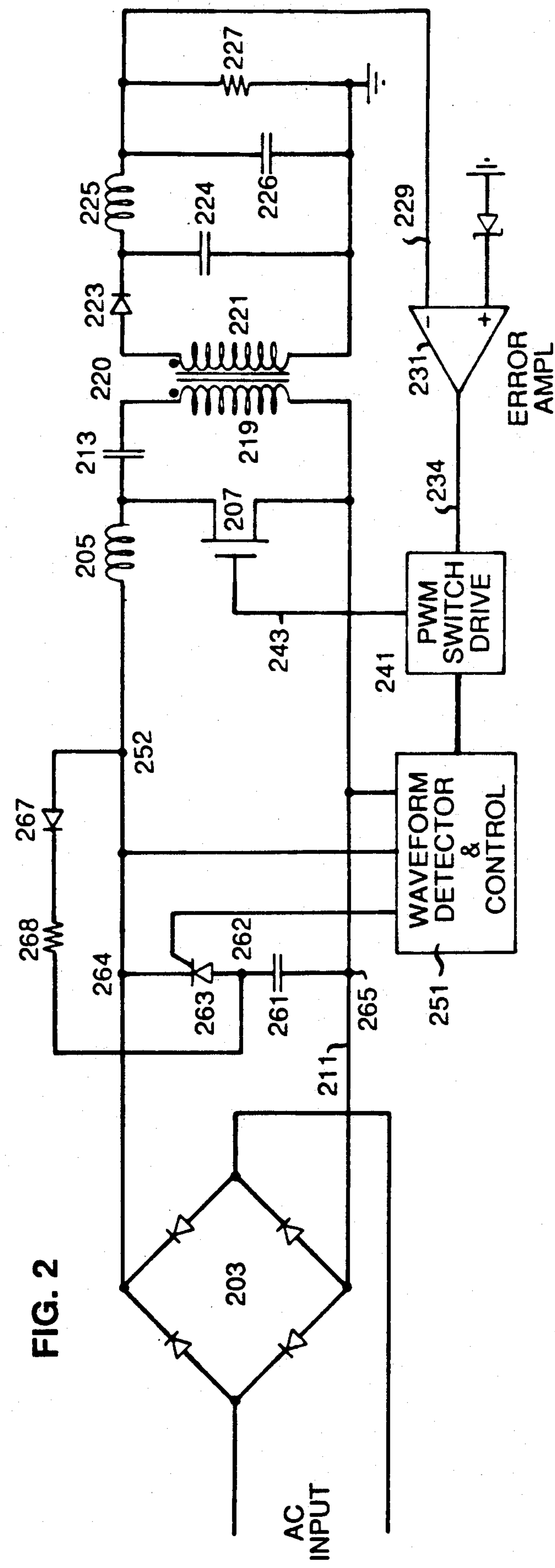
FIG. 2 is a schematic of a modified SEPIC power converter directly powered off of an AC line and adapted for providing power factor correction.

A SEPIC power converter adapted to be powered off an AC power line and provide an enhanced (i.e. higher) power factor at the input is disclosed in FIG. 2. Input AC power is rectified by a full wave rectifier 203. The rectified AC signal is coupled to an inductor 205. A power switch 207, illustratively shown as but not limited to a FET device, connects the inductor 205 to the return lead 211. A capacitor 213 couples the inductor 205 to the primary winding 219 of the power transformer 220. Its secondary winding 221 is coupled via a rectifying diode 223 and filter inductor 225 to a resistive load 227. An energy storage capacitor 224 couples the junction of the rectifying diode 223 and inductor 225 to ground. Capacitor 224 provides intercycle energy storage. Its stored voltage is mostly a DC voltage with a superimposed sinewave component with a frequency twice the frequency of the AC input to the rectifier 203. Output filtering to attenuate ripple voltage is provided by the inductor 225 and capacitor 226.

The output voltage at the load 227 is sensed via lead 229 and applied to the inverting input of error amplifier 231. A Zener voltage reference 233 is connected to its noninverting input. The error voltage output is applied via lead 234 to a pulse width modulator switch drive 241 for providing regulated voltage at the output load 227. The PWM switch drive 241 is coupled, via lead 243, to drive the power switch 207.

A waveform detection and control circuit 251 is connected to nodes 252 and 253 to monitor continued existence of the AC waveform applied there-across. It also has a signal transform function and applies a control waveform to the pulse width modulator so that the power switch is controlled to maintain a current waveform in inductor 205 which is in phase with and substantially replicates the sinusoidal AC voltage waveform applied across the series connection of the inductor 205 and power switch 207. The waveform detection and control circuit 251 comprises a voltage waveform detector and a signal transform circuit that senses the voltage waveform applied to inductor 205 in series with switch 207. In response to the detected voltage it sends a control signal, based on a predetermined transform function to the pulse width modulated switch drive circuit 241 to cause it to adjust the duty cycle of the power switch 207 so that a sinusoidal current waveform is maintained in the inductor 205. Signal transform circuitry and waveform detection circuitry to perform these functions are well known to those skilled in the art and hence it is not believed necessary to disclose this circuitry in detail.

By operating the power switch at a high frequency the values and size of inductor 205, capacitor 213 and the transformer 220 may be kept relatively physically small. The small size of capacitor 213 advantageously limits inrush current when the converter is first connected to AC input power.

Holdover is a requirement of OLS power circuits in order to compensate for glitches in the applied AC power. Holdover circuitry is added to the SEPIC converter to extend its limited holdover capacity and provide this desired feature. A voltage storage capacitor 261 is connected at junction node 262 in series with a triggerable SCR 263 to connect nodes 264 and 265 and shunt the output of the rectifier 203. A series connected diode 267 and resistor 268 interconnect nodes 262 and 252 at the inductor 205. During normal operation the capacitor is charged to a high voltage via the diode 267 and resistor 268. Upon the occurrence of a failure of the input AC the waveform detection and control circuit 251 detects the absence of a an AC input voltage waveform and triggers the SCR 263 into conduction thereby applying the capacitor voltage to the inductor 205 and provide power holdover to the load 227 from the stored energy of capacitor 261. When power is restored the SCR 263 is reverse biased and normal operation of the SEPIC converter is restored. The capacitor 261 is recharged, via resistor 278 and diode 262.

We claim:

1. An off line power converter powered by an AC line power source, comprising:

an input rectifier for rectifying an applied AC line voltage;

a power train including an inductor and a capacitor connected at a juncture in series connection and coupling the rectifier to a power transformer;

a return path connecting the power transformer to the rectifier;

a power switch coupling the juncture to the return path;

an output circuit coupling the power transformer to a load via a rectifying diode and a voltage storage capacitor;

the converter including control circuitry operative for enhancing power factor comprising;

drive circuitry for the power switch including;

a waveform detector for detecting an existence of and a waveform of voltage applied to the inductor;

a pulse width modulator responsive to the wave form detector and having a signal transform characteristic operative to drive the power switch to maintain a current waveform in the inductor substantially sinusoidal;

holdover circuitry for supplying voltage to the inductor in the event of failure of the AC line power source, including;

a holdover voltage storage capacitor connected between the rectifier and the power switch and connected to receive voltage for storage from the rectifier, and a SCR switch connecting the holdover voltage storage capacitor to the inductor; and the waveform detector connected to the inductor and responsive to a discontinuance of voltage applied, via the rectifier, to the inductor and the waveform detector connected to apply a trigger signal to the SCR switch to enable it into conduction and couple the holdover voltage capacitor to the inductor;

whereby the power transformer transforms voltage of the holdover voltage capacitor to an output voltage level.

2. An off line power converter operative for enhancing power factor as claimed in claim 1, and further comprising:

the pulse width modulator responsive to the waveform detector to maintain a current waveform in the inductor substantially identical to the detected waveform.

3. A SEPIC power converter adapted to be powered off of an AC power line, comprising:

a rectifier for rectifying AC line voltage;

a power train including an inductor and a capacitor connected at a juncture in series connection and coupling the rectifier to a power transformer;

a return path connecting the power transformer to the rectifier;

a power switch coupling the juncture to the return path;

an output circuit coupling the power transformer to a load via a rectifying diode and a voltage storage capacitor;

a waveform detector connected and operative for monitoring a waveform of voltage applied to the inductor;

switch control circuitry for controlling a duty cycle of the power switch responsive to the waveform of voltage monitored by the waveform detector and having a signal transform characteristic to control power switch switching so that it constrains a waveform of current in the inductor to be substantially conincident in form with the voltage waveform of voltage monitored by the waveform detector;

holdover circuitry for supplying voltage to the inductor in the event of failure of the AC line voltage, including:

a holdover voltage storage capacitor connected to receive voltage from the rectifier and an SCR switch connecting the holdover voltage storage capacitor to the inductor; and the waveform detector operative to detect an absence of an AC input voltage waveform and responsive to such an absence of voltage to apply a trigger signal to the SCR switch to enable it's conduction and couple the holdover voltage capacitor to the inductor.

4. A SEPIC power converter adapted for off line operation of an AC power source, comprising:

an inductor connected to be energized by a rectified AC voltage waveform supplied from the AC power source;

a coupling capacitor;

an output circuit connected to the inductor via the coupling capacitor connected for applying power to an output terminal for accepting a load;

a power switch connected to the inductor and to the output circuit for enabling alternate current flow in the inductor and the output circuit;

switch control circuitry connected to the power switch for controlling a duty cycle for the power switch and further connected to respond to a voltage waveform applied across the inductor and having a signal transform characteristic that generates a PWM control signal applied to the power switch to constrain a waveform of current in the inductor to be substantially coincident with the voltage waveform;

a holdover voltage storage capacitor connected between the AC power source and the power switch and further connected to be energized by rectified power supplied from the AC power source;

a switch for coupling the holdover voltage storage capacitor to the inductor; and control circuitry connected to monitor the rectified voltage supplied by the AC power source for detecting a failure of the AC power source and further connected to enable the switch coupling the holdover voltage storage capacitor to the inductor.

* * * * *